United States Patent
Salinas

(10) Patent No.: US 6,959,747 B2
(45) Date of Patent: Nov. 1, 2005

(54) MACHINE FOR APPLYING FIBERGLASS REINFORCEMENTS IN DISPOSABLE COLUMN FORMS

(76) Inventor: José Manuel Valero Salinas, Ctra. Nacional 340 P.K. 693, 9-Autovía A-7 Salida 80, E-03350 Cox, (Alicante) (ES)

( * ) Notice: Subject to any disclaimer, the term of this patent is extended or adjusted under 35 U.S.C. 154(b) by 243 days.

(21) Appl. No.: 09/913,702

(22) PCT Filed: Dec. 27, 2000

(86) PCT No.: PCT/ES00/00490

§ 371 (c)(1),
(2), (4) Date: Jan. 23, 2002

(87) PCT Pub. No.: WO01/49948

PCT Pub. Date: Jul. 12, 2001

(65) Prior Publication Data

US 2003/0005998 A1 Jan. 9, 2003

(30) Foreign Application Priority Data

Dec. 31, 1999 (ES) .............................................. 9902893

(51) Int. Cl.$^7$ ..................... B65H 54/00; B65H 81/00; B31B 13/00
(52) U.S. Cl. ..................... 156/446; 156/169; 156/173; 156/425; 156/428; 156/429; 156/443
(58) Field of Search ............................... 156/169, 171, 156/172, 425, 428, 429, 430, 431, 443, 446, 173

(56) References Cited

U.S. PATENT DOCUMENTS

| 3,301,926 A | | 1/1967 | Reiland ..................... 264/46.5 |
|---|---|---|---|
| 3,928,939 A | * | 12/1975 | Edwards et al. ............... 53/442 |
| 4,008,114 A | * | 2/1977 | Lindsey ....................... 156/392 |
| 4,353,763 A | * | 10/1982 | Simons ....................... 156/184 |
| 4,725,326 A | | 2/1988 | Colbachini .................. 156/350 |
| 5,137,595 A | * | 8/1992 | Garcia ......................... 156/425 |
| 5,302,221 A | * | 4/1994 | Golden ....................... 156/187 |

FOREIGN PATENT DOCUMENTS

GB 2075880 * 5/1980

OTHER PUBLICATIONS

European Patent Application No. 94307260.3, published Apr. 5, 1995; Publication No. EP0646685; Inventor: Johnson et al., Title: "Concrete Column Forming Tube Having A Smooth Inside Coated Surface and Method of Making Same.".

* cited by examiner

Primary Examiner—Jeff H. Aftergut
Assistant Examiner—Justin Fischer
(74) Attorney, Agent, or Firm—Law Office of Marc D. Machtinger, Ltd.

(57) ABSTRACT

A pair of rollers (2), constituting the seat and the traction means for the formwork (3) to be reinforced, are established on a bench (1). A pair of upper pressure rollers (12) act, at the same time, on the formwork. On the same bench (1) there are also placed, laterally with respect to the formwork (3), a pair of longitudinal guides (15) for the movement, in parallel to the formwork (3) of a carriage (14) wearing the fiberglass mesh delivering reel (13), said reel (13) being furthermore mounted on the carriage (14) with the possibility to rotate around the vertical axis, in order to vary the orientation of the fiberglass mesh with respect to the formwork (3). The carriage (14), at the end position on the guides (15), delivers the reinforcing band to the formwork (3) in a perpendicular way with respect to the axis of the latter, and after turning around the formwork (3) for some times, the carriage initiates the longitudinal movement while the reel (13) adopts an inclined position, until the opposed end of the formwork (1) is reached, at which moment it reverts to the perpendicular position and thereafter the direction is changed.

7 Claims, 4 Drawing Sheets

A-B

MACHINE FOR APPLYING FIBERGLASS REINFORCEMENTS IN DISPOSABLE COLUMN FORMS

OBJECT OF THE INVENTION

The present invention refers to a machine specially conceived to perform the operation of applying a fiberglass mesh which, when rolled up helicoidally, reinforces externally certain types of disposable formworks used to obtain columns.

The object of the invention is to achieve a completely automatic process for the application of the fiberglass mesh, continuously provided from a reel.

BACKGROUND OF THE INVENTION

The applicant is the owner of the Spanish Patent application number 9800419 in which a disposable formwork for columns is disclosed together with the process for obtaining the same; the formwork is structured from a body or tubular core made of a plurality of expanded polystyrene pieces, fixed to each other by means of adhesive through their joining edges and coated inside by a sheet of plastic material which constitutes a watertight barrier and which is fixed to the core by means of an adhesive layer, while on the outside, the whole formwork is completed by a support in the form of a mesh consisting of a fiberglass mesh having an initial form of a band, and which is rolled up helicoidally on said tubular core, and fixed to the same by means of adhesive, such that said mesh provides appropriate mechanical rigidity to the whole.

As mentioned above, said patent application discloses also the process for obtaining the same formwork, according to which said plastic sheet is placed on a retractable mould which form and dimensions match those of the column to be obtained, said plastic sheet being closed over itself configuring a tubular body, by means of a longitudinal seal; said plastic laminar tube is then coated with an external layer of adhesive; on the other hand, the expanded polystyrene pieces or plates, constituting the body or tubular core of the formwork, have been already made and a layer of adhesive is also applied to both their internal side and their joining edges, and they are subsequently mounted in the mould, with the plastic sheet being interposed in between, said expanded polystyrene pieces being attached thereto while they are fixed to each other, in order to configure said tubular core; then, the external mesh is mounted either by applying a layer of adhesive on the tubular body or thanks to the self-adhesive nature of said mesh, which is rolled up helicoidally from a reel, either by means of the rotation of the mould together with a longitudinal movement of the reel or by means of a planetary movement of the reel around the mould, with a parallel axial movement of one element with respect to the other.

The Certificate of Addition having application Pat. No. 9,802,487 discloses some improvements introduced in said application Pat. No. 9,800,419, consisting in the replacement of the internal plastic coating by rigid plates, which form and dimensions coincide with the walls of the column to be obtained; said plates, made of plasticised wood on their internal side or of rigid plastic, are fixed to each other to configure a tubular body with the help of adhesives tapes appropriately fixed to their internal side in correspondence with the joining edges between the plates, so as to configure an inner tubular body having a completely smooth and sealed surface, on which body the above mentioned pieces made of expanded polystyrene are placed, said pieces constituting the intermediate, rigid tubular body, used to stabilize said plates and on which, in turn, said fiberglass mesh is placed externally, rolled up helicoidally and fixed by means of adhesive, in order to provide the formwork as a whole of the appropriate mechanical resistance. It is also necessary, in this case, in order to place the fiberglass mesh reinforcement to submit the rest of the formwork to a rotational movement or to provide the mesh delivering reel with a planetary movement, combined in any case with an axial and relative movement between the reel and the mould wearing the formwork.

DESCRIPTION OF THE INVENTION

The machine proposed by the present invention has been conceived and designed in order to achieve a completely automatic operation for the helicoidal mounting of the fiberglass mesh on the rest of the formwork.

More particularly, the invented machine is based on one of the two functional solutions cited above, namely the solution consisting of providing the formwork with a rotational movement and providing the reel delivering the fiberglass mesh with a longitudinal movement with respect to said formwork.

Particularly, the machine includes a bench over which a pair of conveniently driven rollers are placed, positioned on an imaginary horizontal plane and conveniently separated in order to constitute a double linear support for the formwork, to which they will provide a rotational movement; a portal-frame emerges from said bench, preferably at a distance behind the driven rollers acting as a seat for the formwork, said portal-frame including two vertical fixed guide poles and a transversal bridge vertically movable along guides operatively established for that purpose, actuated by a motor conveniently established in one of the guide poles and having appropriate transmission means like, for example, a spindle, said bridge including a plurality of front arms constituting supports for the correspondent pair of rollers, which can move also vertically, in order to exert a pressure on the upper part of the formwork; for this purpose, each arm is linked to the bridge through a pneumatical cylinder which, when conveniently controlled, regulates the pressure exerted by the upper rollers against the lower ones, with the formwork interposed in between, in order to guarantee a close fastening of the fiberglass mesh to said formwork.

The fiberglass mesh is delivered by means of a reel, from which it is extracted due to the rotation of the lower rollers. The reel is mounted on a carriage moving longitudinally on the bench, particularly on guides parallel to the lower or traction rollers, while the reel is also mounted on said carriage with the possibility to rotate around a vertical axis, in order to allow the reel to deliver the band of fiberglass mesh on the bias with respect to the formwork, to achieve the helicoidal rolling up in both directions and also to obtain a rolling up being perpendicular to the axis of the formwork at the end zones of the same, where the change of direction of the helicoidal rolling up is produced, when successive reinforcing layers are applied to the mould.

Obviously, said carriage for applying the reinforcement is provided with motors in order to achieve both the longitudinal displacement of the same in one direction or the other, and to vary ad-hoc the approach angle of the reinforcement reel with respect to the formwork.

The equipment for applying the reinforcement includes additionally a moving blade which causes the cut of the band of fiberglass mesh at the end of the reinforcement application phase.

DESCRIPTION OF THE DRAWINGS

In order to complete the present description and to contribute to a better understanding of the features of the invention, a set of drawings according to a preferred embodiment of the invention is included for illustrative and not limitative purposes, where.

PREFERRED EMBODIMENT

Figure 1:
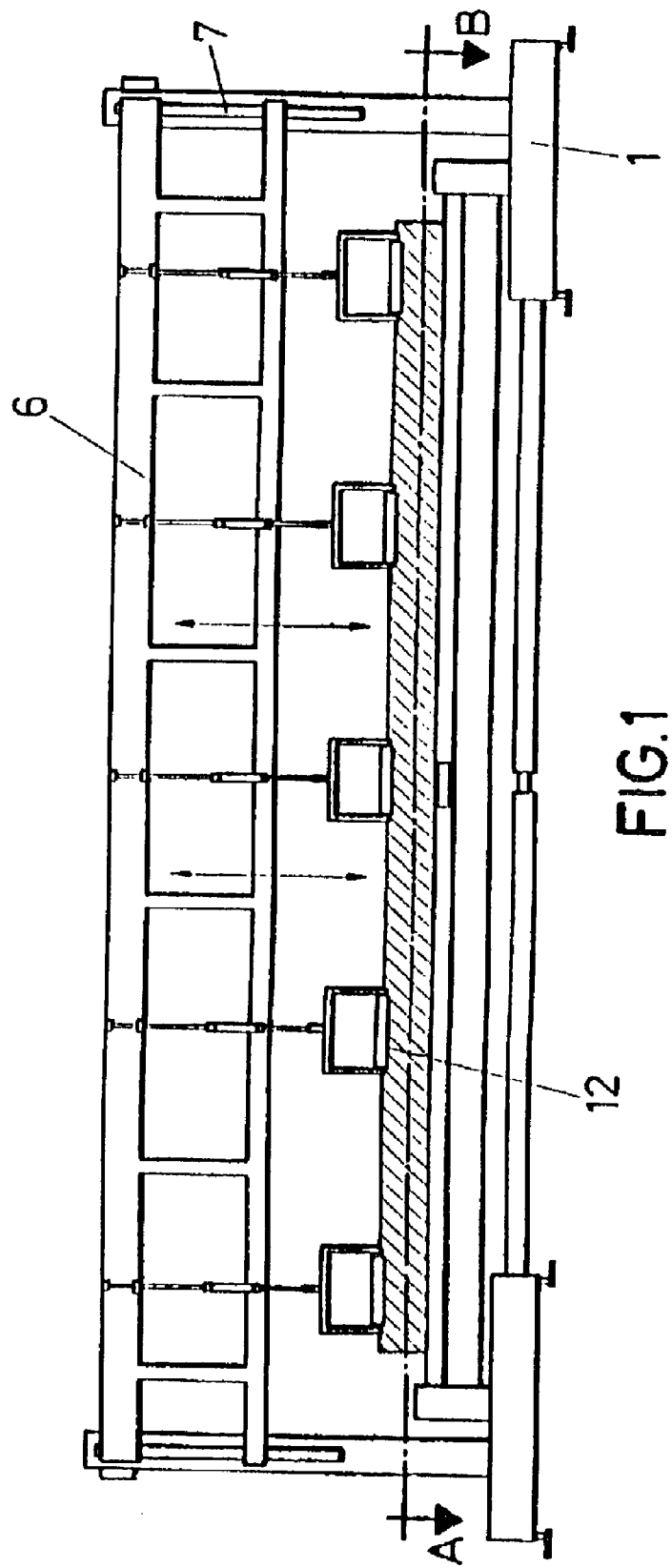
FIG. 1 shows a schematic drawing of a front elevation view of a machine for applying fiberglass reinforcement to disposable formworks for columns, made according with the object of the present invention.
Figure 2:
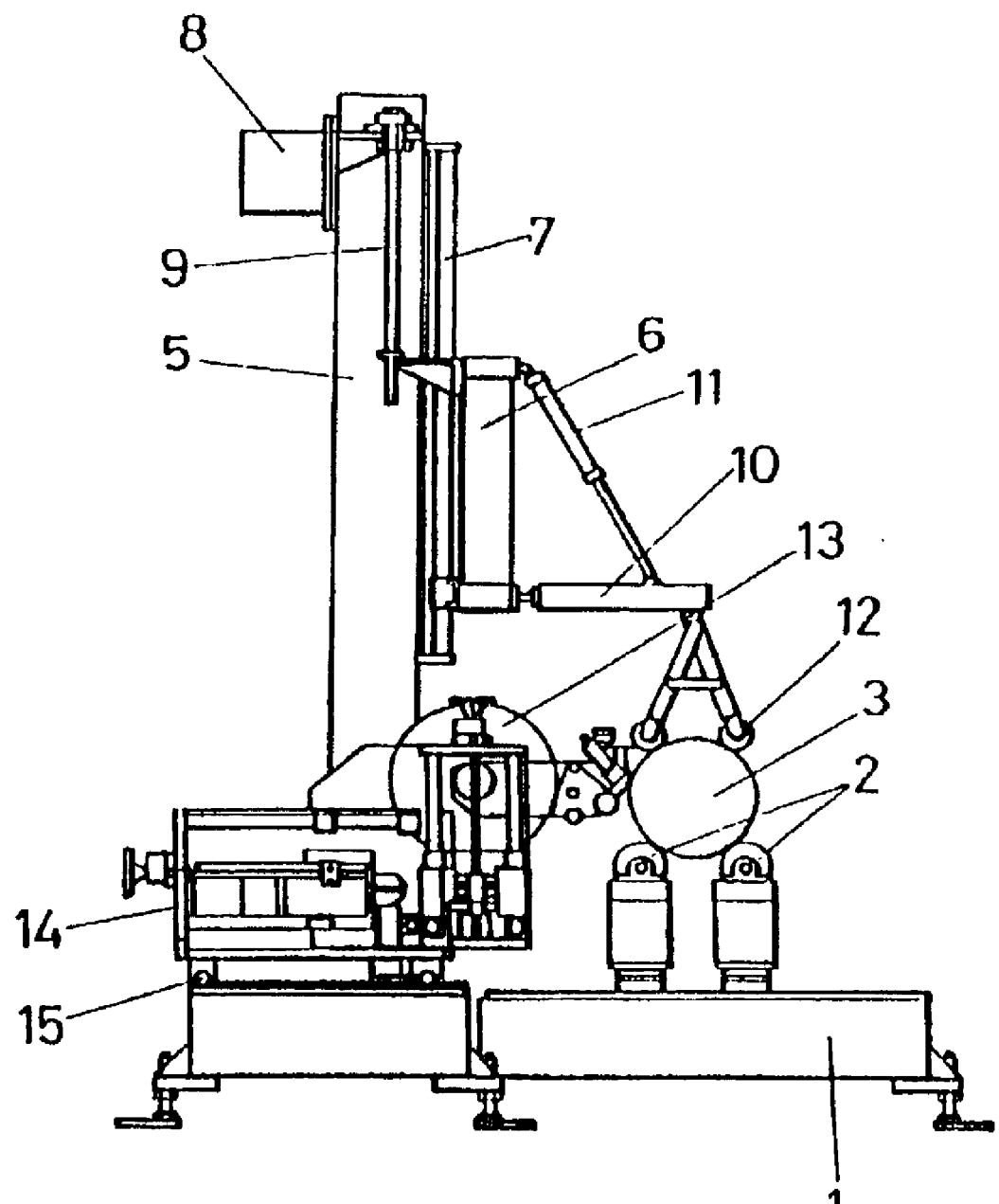
FIG. 2 shows a profile of the same machine.
Figure 3:
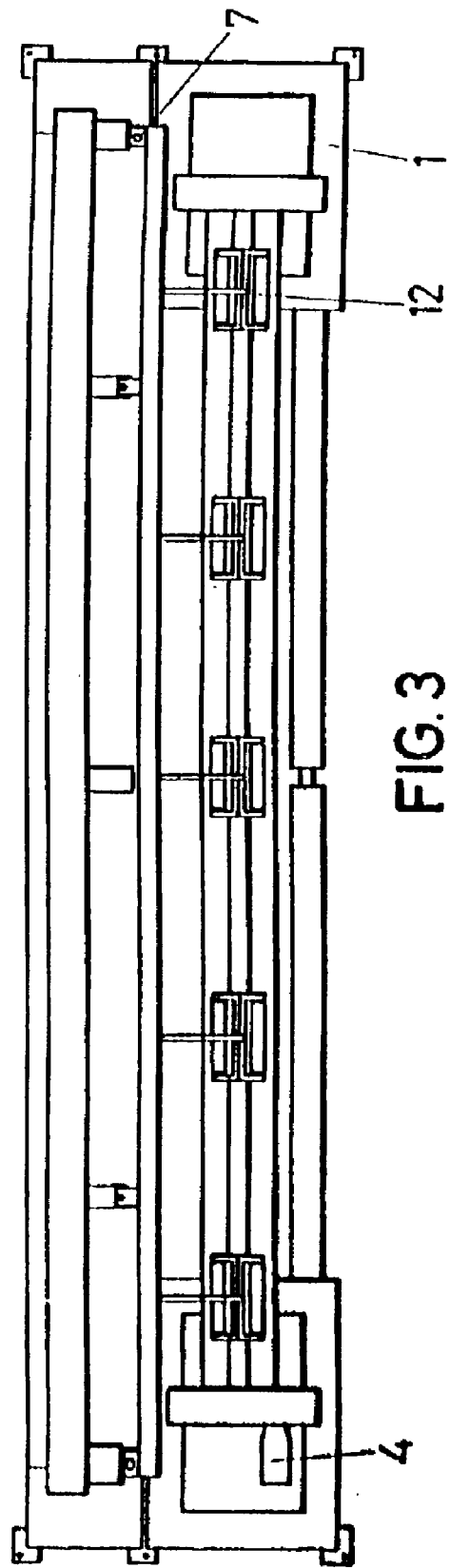
FIG. 3 shows a schematic drawing of a ground view of the machine represented in the preceding figures.
Figure 4:
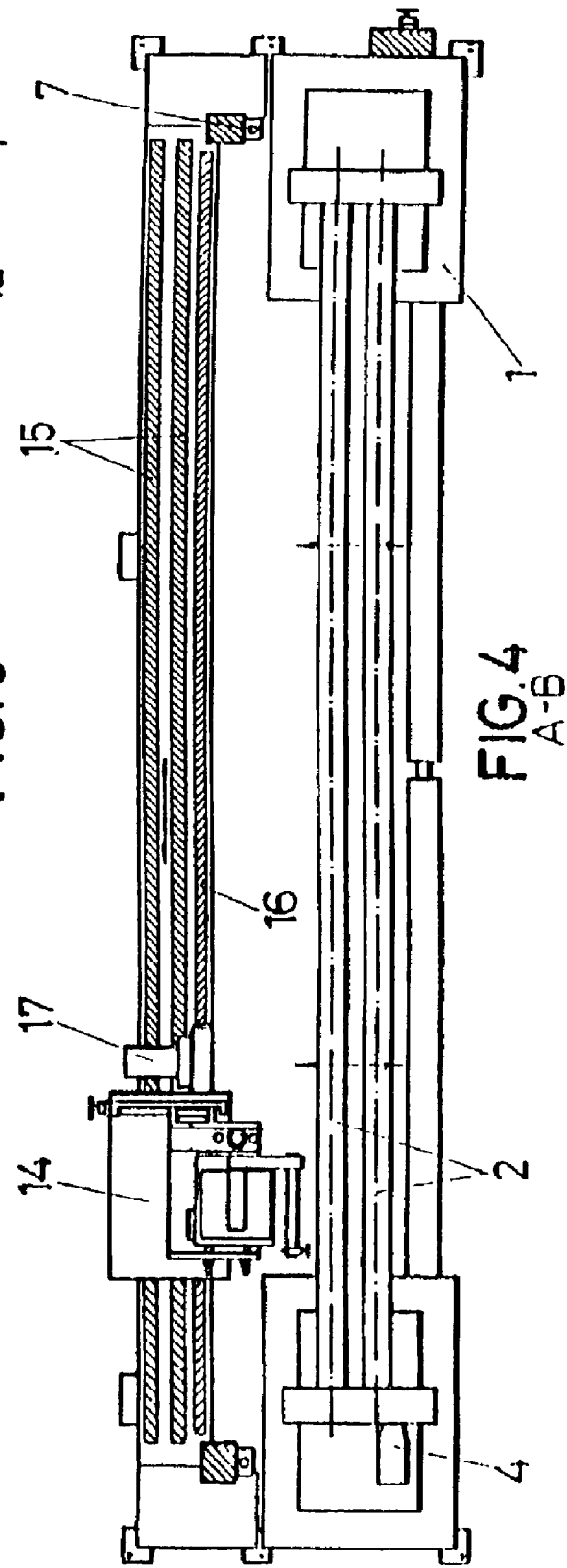
FIG. 4 shows a transversal section of the set illustrate in FIG. 1, according to cut line A-B in said figure.
Figure 5:
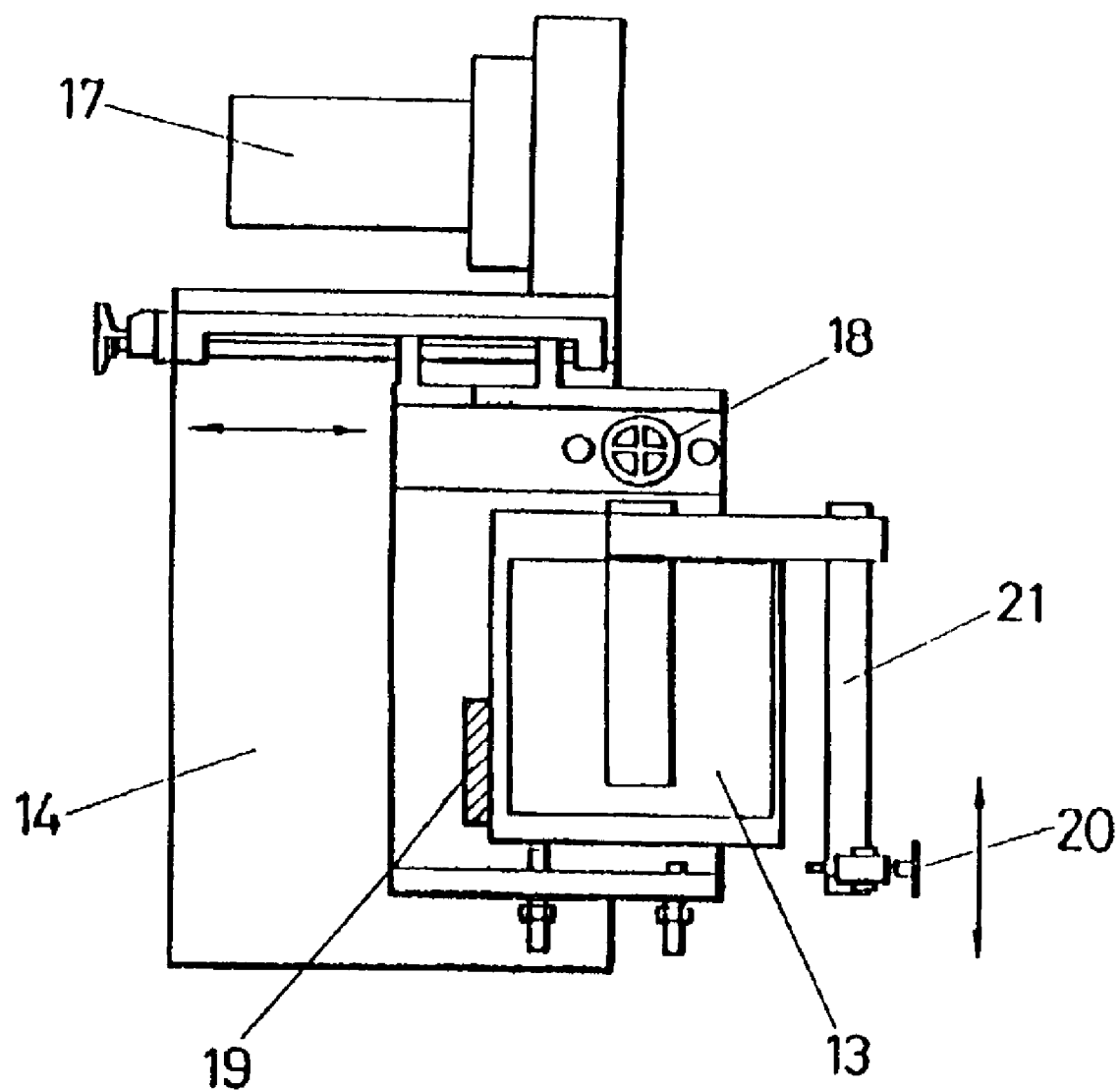
FIG. 5 shows, finally, an enlarged detail of the preceding figure, at the level of the reinforcement application equipment.

Referring to the figures, it can be seen that the machine object of the present invention is structured based on a substantially elongated bench (1), on which a pair of rollers (2) is placed, said rollers having an appropriate length in order to receive the formwork (3) to be reinforced; for this reason the rollers (2) are parallel and are conveniently separated, as seen particularly in FIG. 2. The rollers are actuated by a motor element (4) providing a rotational and controlled movement around their own axes, which is transmitted to said formwork (3). The rollers (2) are preferably configured with adjustable separation in order to adjust said separation to different diameters of the formwork (3), i.e, to varying sections of the column to be obtained with such a formwork.

On the bench (1), a portal-frame is established said portal-frame being made of 2 vertical, fixed poles (5) between which a bridge structure (6) is placed, being vertically movable along axes or guides (7) with the help of a motor (8) and through an appropriate transmission, like for instance a spindle (9). Said bridge structure (6) has a plurality of lower arms (10), frontally projected, articulated and actuated by their respective pneumatical cylinders (11). Said arms (6) constitute the support means for the respective pairs of rollers (12) which aim is to act on the upper part of the formwork (3), as it can also be seen in FIG. 2, in such a way that while the lower rollers (2) provide a seat and a rotational movement to the formwork, the upper rollers (12) act as pressing elements due to the effect of the cylinders (11) while keeping the formwork (3) perfectly stable on the lower rollers (2) and assuring a close contact between the band of fiberglass mesh provided by the reel (13) and the same formwork (3), to obtain a perfect tight fitting and a perfect fixing of the same.

The reinforcing reel (13) is placed on a carriage (14) which can move longitudinally on the bench (1) along a pair of longitudinal guides (15) and with the help, for example, of a dragging chain (16) actuated by a motor (17) in such a way that said carriage (14) can provide a longitudinal movement to the reel (13), parallel to the formwork (3), along its complete length, in both directions, while said reel (13) can also rotate about a vertical axis (18), being engaged by another motor (19), in order to make the fiberglass mesh to approach the formwork (3) perpendicularly to the same, particularly at the end zones, or to allow an approach at any angle, in both directions, to allow the desirable helicoidal rolling up along said formwork (3).

More particularly, it is foreseen for the carriage (14) to travel at least two times along the whole length of the formwork (3), in opposed directions, in such a way that the rolling up of the fiberglass mesh is produced with a certain angle in one direction and with the opposed angle in the other direction and perpendicularly at the end zones of the formwork (3).

The structure disclosed above contains additionally a cutting blade (20) mounted on a movable axis (21) in such a way that said blade can adopt a non working position, during the whole process of application of the fiberglass mesh, and eventually it can reach a cutting situation in which it cuts said mesh, moment at which the working cycle of the machine comes to an end.

Finally, it only has to be noted that the reinforcement delivering reel (13) is provided with an automatic brake, working against the traction effect produced by the rollers (2), enabling to establish the appropriate tension in the fiberglass mesh while covering the formwork (3), to ensure an absolute indeformability of said formwork when standing the pressure due to the concrete, during the use of the same.

What is claimed is:

1. Machine for applying a fiberglass reinforcement to disposable formworks for columns, particularly for formworks provided with a tubular body, preferably made of expanded polystyrene, having a sealing inner coating and an external coating or reinforcement made of a band of fiberglass mesh rolled up helicoidally on said tubular body, characterized in that it includes, on an elongated bench (1), which dimensions are according to the dimensions of the formwork (3), a pair of longitudinal rollers (2) constituting a seat for said formwork (3) and being conveniently motorized in order to confer a rotational movement to the formwork (3) with the assistance of upper pressure rollers (12), having also a carriage (14) on said bench (1), movable in parallel to the rollers (2–12), wearing the fiberglass mesh delivering reel (13), with the special particularity that said reel (13) is mounted on the carriage (14) having the possibility to rotate around a vertical axis (18) in order to vary the angle of the continuous band of fiberglass mesh with respect to the axis of the formwork (3), enabling the helicoidal rolling up in both directions as well as the rolling up perpendicular to the formwork (3), particularly at the ends of the same, the reinforcement delivering reel (13) being furthermore assisted by an automatic brake against which the traction rollers (2) are acting, in order to confer the appropriate tension to the fiberglass mess during its rolling up on the formwork (3), further characterized in that a portal frame is established on the bench (1), made of a pair of fixed poles (5) on which a bridge structure (6) is placed, vertically movable along guides (7) by means of a motor (8), said bridge structure (6) having a plurality of lower arms (10) projecting frontally, articulated and actuated by their respective pneumatical cylinders (11), having arms (10) supporting at their free ends said pressure rollers (12), by which they acquire an adjustable height in order to adapt to formworks (3) having different diameters, and exerting a pressure on the latter thanks to the strain provided by the cylinders.

2. Machine for applying a fiberglass reinforcement to disposable formworks for columns, according to claim 1, characterised in that a pair of longitudinal guides (15) are placed on the bench (1), in parallel to the traction rollers (2), for the movement of the carriage (14) with the help of a motor (17) acting on a moving chain (16) or on any other appropriate transmission means, having the particularity that another motor (19) is mounted on the same carriage (14) to change the orientation of the reinforcement reel (13) with respect to the formwork (3).

3. Machine for applying a fiberglass reinforcement to disposable formworks for columns, according to claim 1, characterised in that a pair of longitudinal guides (15) are placed on the bench (1), in parallel to the traction rollers (2), for the movement of the carriage (14) with the help of a motor (17) acting on a moving chain (16) or on any other appropriate transmission means, having the particularity that another motor (19) is mounted on the same carriage (14) to change the orientation of the reinforcement reel (13) with respect to the formwork (3).

4. Machine for applying a fiberglass reinforcement to disposable formworks for columns, according to claim 1, characterised in that the carriage further comprises a blade (20) for cutting the band of fiberglass mesh constituting the reinforcement, accompanying the correspondent reel (13) in its movements, and being movable along an axis (21) during the cutting operation.

5. Machine for applying a fiberglass reinforcement to disposable formworks for columns, according to claim 1, characterised in that the carriage further comprises a blade (20) for cutting the band of fiberglass mesh constituting the reinforcement, accompanying the correspondent reel (13) in its movements, and being movable along an axis (21) during the cutting operation.

6. Machine for applying a fiberglass reinforcement to disposable formworks for columns, according to claim 2, characterised in that the carriage further comprises a blade (20) for cutting the band of fiberglass mesh constituting the reinforcement, accompanying the correspondent reel (13) in its movements, and being movable along an axis (21) during the cutting operation.

7. Machine for applying a fiberglass reinforcement to disposable formwork for columns, according to claim 3, characterised in that the carriage further comprises a blade (20) for cutting the band of fiberglass mesh constituting the reinforcement, accompanying the correspondent reel (13) in its movements, and being movable along an axis (21) during the cutting operation.

* * * * *